Aug. 23, 1949.   C. A. LAPP   2,480,034
PIPE FITTING
Filed Sept. 9, 1946
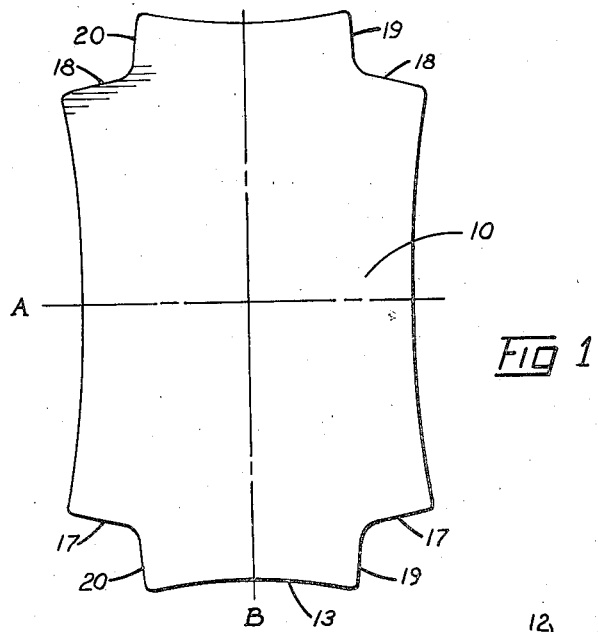
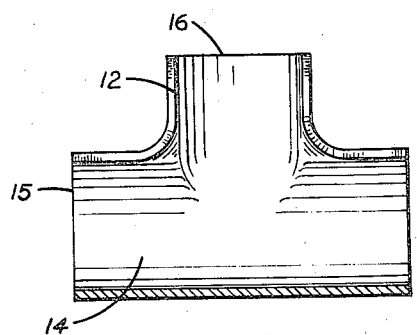
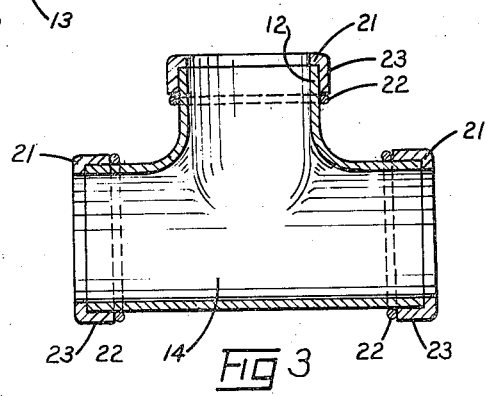
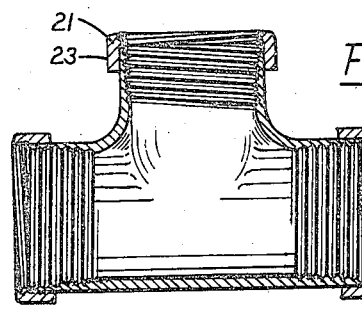
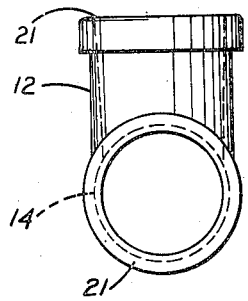
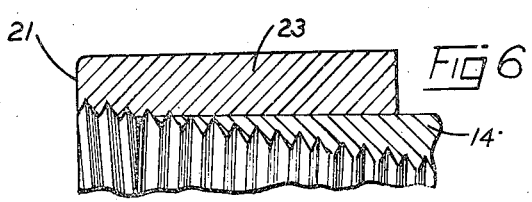
INVENTOR.
CHESTER A. LAPP
BY
ATTORNEYS Patented Aug. 23, 1949

2,480,034

UNITED STATES PATENT OFFICE 2,480,034

PIPE FITTING

Chester A. Lapp, Cleveland, Ohio

Application September 9, 1946, Serial No. 695,766

1 Claim. (Cl. 285—210)

This invention relates broadly to pipe fittings and more specifically to fittings of the type that are formed from fabricated sheet metal blanks.

The objects of the invention reside in the provision of a reenforcing structure for ends of a pressed sheet metal fitting which will restrain deformation of the formed blank during the brazing operation thereof; which will facilitate the production of a fitting with a pipe thread in the end thereof which is full thread depth and requisite wall thickness, which will prevent rupture of the side walls of the fitting during assembly thereof with other threaded parts, which will accommodate the use of a pipe wrench without mutilation of the fitting and a structure that will withstand higher internal pressure than similar fittings heretofore constructed.

Further objects of the invention reside in the production of a fitting which is light in weight, durable of structure, economic of manufacture and free from internal surface protuberances or cavities.

Other objects and advantages more or less ancillary to the foregoing and the manner in which all the various objects are realized will appear in the following description, which, considered in connection with the accompanying drawings, sets forth the preferred embodiment of the invention.

In the accompanying drawings, a T fitting has been chosen as illustrative of one embodiment within which the invention may be incorporated. It is to be understood, however, that other similar parts such as elbows, nipples, crosses, caps, etc. may be formed in a similar manner and are contemplated herein as equivalents.

Referring to the drawings:

Fig. 1 is a plan view of the blank from which the improved fitting is formed;

Fig. 2 is a longitudinal section through the formed blank before the end caps are brazed thereon;

Fig. 3 is a longitudinal section through the fitting assembly;

Fig. 4 is a similar section of the fitting after the brazing and machining operations;

Fig. 5 is an end elevational view thereof; and

Fig. 6 is an enlarged sectional view of a fragmentary portion of the threaded end of the fitting.

Referring first to Fig. 1, the blank 10 is die struck from sheet metal stock of the requisite gauge for the part being made, consideration being given the size of the fitting, the character of the metal employed and the pressure to which the fitting is to be subjected.

In the blank illustrated, the side walls 11 are curved inwardly towards the major axis of the blank to compensate for the draw of the metal during the bending or forming operation of the branch tube 12. The ends 13 of the tabs from which the semi-cylindrical walls of the branch tube 12 are struck are likewise curved towards the center of the blank compensative of the draw in forming the main tubular body 14 of the T. With a blank of such configuration, the ends 15 of the fitting will be flat and normal to the axis of the tubular body 14 and the ends 16 will be flat and normal to the axis of the branch 12 after the blank has been pressed into its finished form. In the forming operation, the blank is folded about its minor axis A in configuration of a cylindrical tube with the walls 17 and 18 in abutting relation with each other. Such portion of the blank forms the tubular body 14. Simultaneously the outer end portions of the blank are folded and drawn about the major axis B in configuration of a cylindrical tube with the walls 19 and 20 in abutting relation. This portion of the blank forms the branch 12. After the forming operation, caps 21 having openings in the end thereof equal in size to the inside diameter of the tubular sections of the fitting are pressed over the free ends thereof, then copper, silver or other brazing wires 22 are trained over the junction between the cap flanges 23 and body sections. A brazing compound such as a paste may be used in lieu of the wires and may be placed about the parting line defined by the abutting walls 17, 18, 19 and 20. As an alternate, the parts may be formed from copper clad steel then after any of the foregoing operations, the assembly may be placed in a brazing furnace to effect the union of the parts and affixture of the mating faces of the formed blanks.

The open ends of the fitting thus formed may then be reamed, if necessary, and tapped. As contemplated herein, the flanged portions 23 of the caps are designed to extend inwardly and overlie the portions of the fittings that are weakened by removal of the stock during a pipe thread tapping operation. Moreover, the gauge of the stock employed in the construction of the caps is of adequate thickness to facilitate the production of a pipe thread of full depth without sacrifice of strength or rigidity of the side wall in the throat of the respective openings.

From the foregoing, it will be recognized that the interior surfaces of the improved fitting will be free from such voids or protrusions as are customarily found in cast or forged fittings of a similar class, that the rolled steel stock will facilitate the production of a fitting of greater strength and greater uniformity of wall thickness than cored castings, that the fitting will require less machine work than forged or cast parts, that the exterior appearance thereof will be clean, smooth, and free from parting line impressions or flash and that the reenforcing collars or caps will not only prevent separation of the brazed lineal seam in the formed blank but will, in addition, provide a scuff ring for the reception of pipe wrenches or similar tools used in assembly.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

A pipe fitting comprising a sheet metal blank folded in configuration of a generally tubular body with abutting edges, sheet metal rings surrounding the ends of said tubular body, the joints between said parts all being brazed together, and internal tapered pipe threads in the ends of said fitting, the major root diameter of said threads exceeding the outer diameter of the body end portions whereby said threads extend into an outer end portion of each ring, the inner wall of said body continuing from the minor diameter of said threads without obstruction.

CHESTER A. LAPP.

REFERENCES CITED

The following references are of record in the file of this patent:

UNITED STATES PATENTS

| Number | Name | Date |
|---|---|---|
| 373,093 | Pew | Nov. 15, 1887 |
| 463,755 | Homer | Nov. 28, 1891 |
| 1,518,599 | Murray | Nov. 8, 1927 |
| 1,648,026 | Murray | Nov. 8, 1927 |
| 1,811,501 | Holmes | June 23, 1931 |
| 1,889,974 | Chamberlin | Dec. 6, 1932 |
| 2,157,918 | Rankin | May 9, 1939 |

FOREIGN PATENTS

| Number | Country | Date |
|---|---|---|
| 5852 | Great Britain | 1895 |